(12) United States Patent
Richason et al.

(10) Patent No.: US 8,016,022 B2
(45) Date of Patent: Sep. 13, 2011

(54) SYSTEMS AND METHODS FOR PASSIVE THERMAL MANAGEMENT USING PHASE CHANGE MATERIAL

(75) Inventors: Chad E. Richason, Seminole, FL (US); Dean R. Hellickson, Palm Harbor, FL (US); Mark W. Watson, New Port Richey, FL (US); Allen F. Tuthill, Clearwater, FL (US)

(73) Assignee: Honeywell International Inc., Morristown, NJ (US)

( * ) Notice: Subject to any disclaimer, the term of this patent is extended or adjusted under 35 U.S.C. 154(b) by 1186 days.

(21) Appl. No.: 11/563,262

(22) Filed: Nov. 27, 2006

(65) Prior Publication Data

US 2008/0121375 A1    May 29, 2008

(51) Int. Cl.
*H05K 7/20* (2006.01)
(52) U.S. Cl. ............... 165/10; 74/5 R; 165/47; 361/700
(58) Field of Classification Search .............. 165/185, 165/80.3, 104.26, 104.33, 10; 361/700, 704, 361/697
See application file for complete search history.

(56) References Cited

U.S. PATENT DOCUMENTS

| | | | | |
|---|---|---|---|---|
| 2,904,617 A * | 9/1959 | King | | 174/544 |
| 3,119,452 A * | 1/1964 | Sammis | | 169/26 |
| 3,737,728 A * | 6/1973 | Austin | | 361/694 |
| 3,811,493 A * | 5/1974 | Bilinski et al. | | 165/272 |
| 4,694,119 A * | 9/1987 | Groenewegen | | 174/521 |
| 4,782,893 A * | 11/1988 | Thomas | | 165/185 |
| 4,869,954 A * | 9/1989 | Squitieri | | 442/13 |
| 4,944,401 A * | 7/1990 | Groenewegen | | 206/521 |
| 5,123,538 A * | 6/1992 | Groenewegen | | 206/521 |
| 5,575,956 A * | 11/1996 | Hermansen et al. | | 252/514 |
| 5,708,565 A * | 1/1998 | Fairbanks | | 361/704 |
| 5,750,925 A * | 5/1998 | Purdom | | 174/544 |
| 5,847,927 A * | 12/1998 | Minning et al. | | 361/696 |
| 5,931,222 A * | 8/1999 | Toy et al. | | 165/80.3 |
| 5,945,217 A * | 8/1999 | Hanrahan | | 428/389 |
| 6,153,720 A * | 11/2000 | Olzak et al. | | 528/182 |
| 6,165,612 A * | 12/2000 | Misra | | 428/344 |
| 6,197,859 B1* | 3/2001 | Green et al. | | 524/270 |
| 6,285,078 B1* | 9/2001 | Nelson | | 257/712 |
| 6,286,212 B1* | 9/2001 | Eaton | | 29/890.03 |
| 6,343,647 B2* | 2/2002 | Kim et al. | | 165/185 |
| 6,706,966 B2* | 3/2004 | Browning et al. | | 174/542 |
| 6,876,550 B2* | 4/2005 | Sri-Jayantha et al. | | 361/699 |
| 7,040,383 B2* | 5/2006 | Oyamada | | 165/104.33 |
| 2005/0200376 A1* | 9/2005 | Yee et al. | | 324/765 |

* cited by examiner

*Primary Examiner* — Allen Flanigan
(74) *Attorney, Agent, or Firm* — Fogg & Powers LLC

(57) ABSTRACT

Systems and methods for passive thermal management using phase change material are provided. In one embodiment, a thermal management method is provided. The method comprises securing an electronics assembly to a mounting surface using a thermally insulative support structure; insulating a phase change material within the support structure; and melting the phase change material to reduce heat transfer from an external environment to the electronics assembly during a high temperature transient thermal condition.

20 Claims, 3 Drawing Sheets

SYSTEMS AND METHODS FOR PASSIVE THERMAL MANAGEMENT USING PHASE CHANGE MATERIAL

BACKGROUND

Electronic packages are often used in vehicles, or other devices, that experience highly transient and extreme thermal environments. A guidance system for a jet aircraft or missile is just one example of such an electronic package. Theses electronic packages must be maintained within a given thermal operating range in order to maintain reliability and/or survive their environment. Thermal management techniques, such as forced air or liquid cooling, are known in the art, but their use includes drawbacks such as increased system complexity, cost, and weight, and a decrease in reliability as additional active components are added to the system.

For the reasons stated above and for other reasons stated below which will become apparent to those skilled in the art upon reading and understanding the specification, there is a need in the art for improved systems and methods for passive thermal management.

SUMMARY

The Embodiments of the present invention provide methods and systems for passive thermal management using phase change material and will be understood by reading and studying the following specification.

In one embodiment, a thermal management method is provided. The method comprises securing an electronics assembly to a mounting surface using a thermally insulative support structure; insulating a phase change material within the support structure; and melting the phase change material to reduce heat transfer from an external environment to the electronics assembly during a high temperature transient thermal condition.

BRIEF SUMMARY OF THE DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Figure 1:
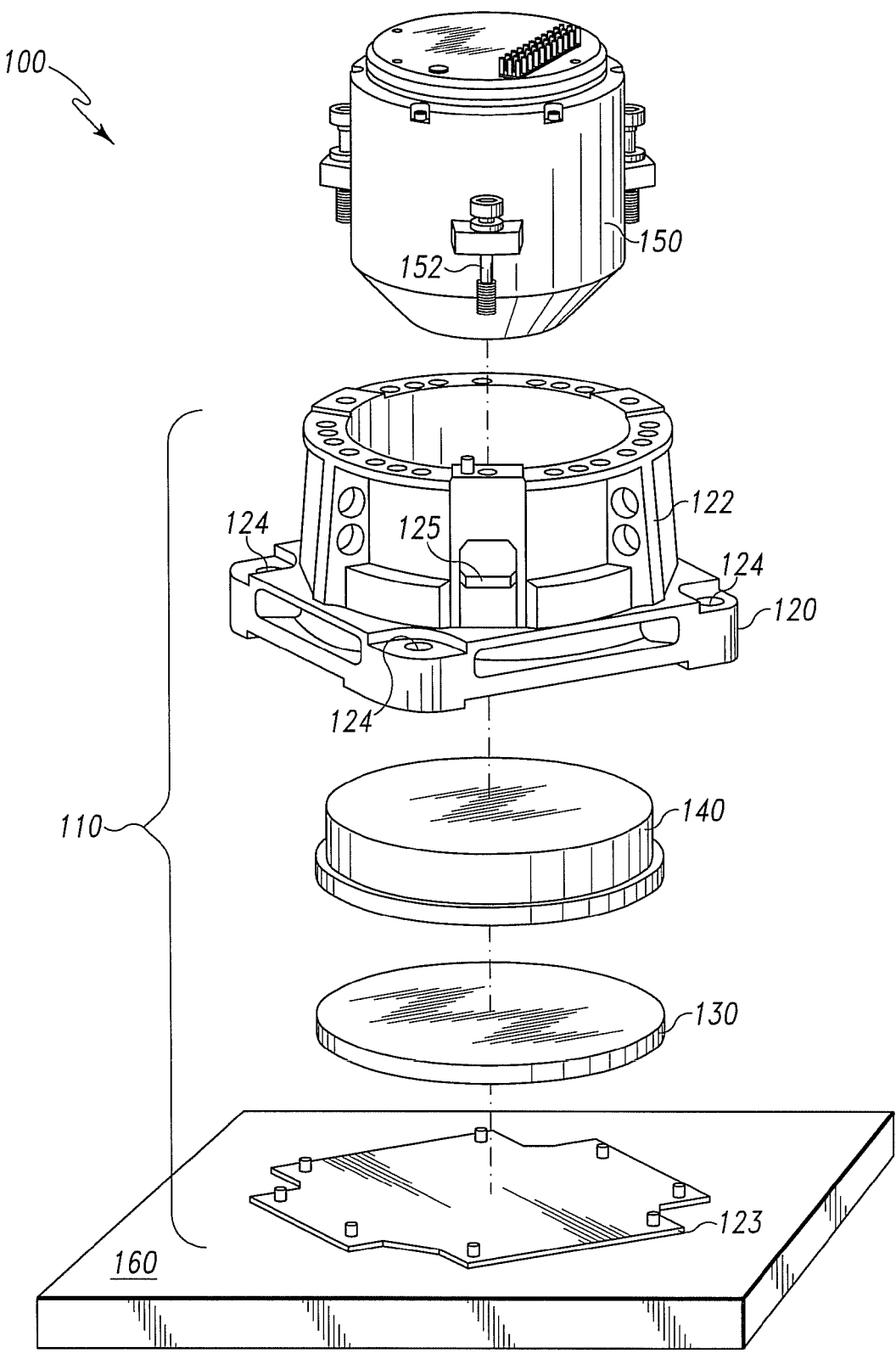
FIG. 1 is a three-dimensional exploded view drawing of a thermal management assembly of one embodiment of the present invention in combination with an electronics assembly.

Embodiments of the present invention provide thermal management for electronic packages through the combined use of insulating materials and phase change material (PCM) within a supporting structure. FIG. 1 is an exploded three-dimensional view of a thermal management assembly 110 of one embodiment of the present invention, shown generally at 100. Thermal management assembly 110 comprises a structural component 120, an insulating component 130, and a PCM component 140.

In the embodiment of FIG. 1, structural component 120 includes a housing 122 that holds insulating component 130 and PCM component 140, and a base 123 to seal insulating component 130 and PCM component 140 within structural component 120. Structural component 120 comprises a low density, laminated thermosetting material that secures to electronic assembly 150, providing structural support for electronic assembly 150 with minimum weight. One example of a low density, laminated thermosetting material is glass epoxy laminate such as, but not limited to, FR-4. Other implementations may use other materials such as, but not limited to Phenolic. In one embodiment, electronic assembly 150 is coupled to structural component 120 via bolts (152) or some other fastener such as, but not limited to, clamps, pins, or adhesives. Structural component 120 provides a stable platform to support mounting electronic assembly 150 to a bulkhead or similar mounting surface (160). In the embodiment shown in FIG. 1, structural component 120 includes mounting holes 124 that facilitate the use of bolts or other fasteners (not shown) for securing thermal management assembly 110 to the mounting surface, and thus supports mounting electronic assembly 150 to the surface 160.

In addition to providing physical support, structural component 120 serves to at least partially shield electronic assembly 150 from any surrounding heat loads by reducing conductive and convectional thermal transfer from the surrounding environment to electronic assembly 150. Structural component 120 also provides conductive and convective heat transfer paths (such as cooling vents shown at 125, for example) that allow electronic assembly 150 to dissipate heat, and maintain temperatures within its rated operating range under normal (i.e., steady state) thermal conditions. In an alternate embodiment, structural component 120 comprises a completely sealable enclosure that encloses and protects electronic assembly 150 from potentially harmful corrosive environments or from direct fluid interactions.

Figure 2:
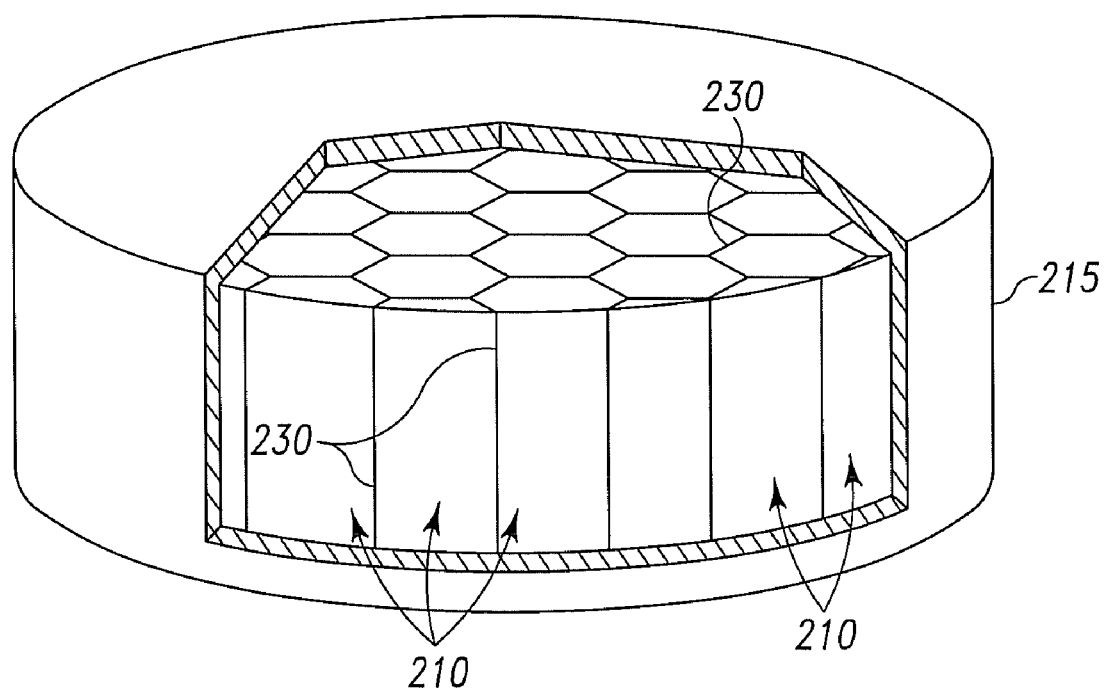
FIG. 2 is a three-dimensional cross-sectional view of a phase change material component of one embodiment of the present invention.

PCM component 140 is the primary thermal management component of thermal management assembly 110 and provides a constant temperature base that thermally shields electronic assembly 150 during high temperature transient events by passively absorbing heat dissipated from the surface 160 and from the surrounding environment. PCM component 140, a cross-sectional view of which is shown in FIG. 2, comprises a phase change material 210 that remains in a solid state during steady state conditions. As would be appreciated by one of ordinary skill in the art upon reading this specification, a phase change material relies on its latent heat of melting for thermal storage to maintain itself at its melt temperature until it has completely melted into liquid form. In other words, as phase change material 210 reaches the temperature at which it begins to changes phase from solid to liquid, it is able to absorb large amounts of heat without itself getting hotter until it completely melts.

Referring back to FIG. 2, phase change material 210 is sealed within enclosure 215. Also within enclosure 215 resides a carbon fiber core 230 structure into which phase change material 210 is embedded. In the particular embodiment illustrated in FIG. 2, carbon fiber core 230 comprises a honeycomb structure that holds phase change material 210 within enclosure 215. In other embodiments, other matrix configurations for carbon fiber core 230 are contemplated as within the scope of embodiments of the present invention. For example, another embodiment may include a carbon fiber core 230 having carbon fibers oriented and inter-weaved in a vertical fashion. Carbon fiber core 230 channels heat from outside sources and distributes the heat evenly through-out the entire volume of phase change material 210. The even distribution of heat provided by carbon fiber core 230 ensures that melting of phase change material 210 occurs evenly through-out the entire volume of enclosure 215, rather than having localized melting occurring in certain areas (an external interfacing surface, for example). The use of carbon fiber material for carbon fiber core 230 also has the advantage of only adding a negligible amount of weight to thermal management assembly 110 while providing a degree of stress relief to phase change material 210.

A direct contact interface between at least one surface of electronic assembly 150 and enclosure 215 provides an efficient heat transfer path to ensure that heat absorbed by enclosure 215 is transmitted to phase change material 210. In one embodiment, enclosure 215 is fabricated from a material, such as but not limited to aluminum. As would be appreciated by one of ordinary skill in the art, aluminum possesses good heat conduction properties but does not excessively contribute to the total weight of thermal management assembly 110.

In one embodiment, enclosure 215 is filled with phase change material 210 and carbon core 230 under vacuum and elevated temperatures to hermetically seal enclosure 215. Hermetically sealing enclosure 215, under elevated temperature, controls expansion of phase change material 210 and also prevents galvanic corrosion. In one embodiment, the elevated temperatures used during sealing are approximately equivalent to those temperatures expected during a high-temperature thermal transient condition.

Insulating component 130 provides additional lightweight insulation strategically placed to reduce heat load induced on PCM component 140 by the surrounding environment and from the surface 160. For example, locating insulating component 130 between PCM component 140 and mounting surface 160 slows heat transfer from surface 160 to PCM component 140. Insulating component 130 thus extends the duration of time through which PCM component 140 can function as a thermally absorbent heat shield during a high-temperature thermal transient condition. ROHACELL® foam is one example of a material that can be used for insulating component 130, although other materials may be used and are contemplated as within the scope of embodiments of the present invention. In one embodiment, insulating component 130 is sealed within structural component 120 to prevent insulating component 130 from being exposed to hazardous materials such as, but not limit to, jet fuel.

Together, insulating component 130, PCM component 140 and structural component 120 provide sufficient thermal insulation and thermal capacitance to shield electronic assembly 150 from the effects of high-temperature thermal transient conditions by thermally isolating the electronics assembly 150 during such events.

In various embodiments, electronics assembly 150 can include any type of electronic device (such as but not limited to an inertial navigation sensor, for example), or group of electronic devices, that must be maintained within a rated temperature range to maintain proper operation.

One exemplary application of thermal management assembly 110 is to protect one or more inertial measurement units that, in one embodiment, comprise electronics assembly 150. For many aircraft, inertial measurement units are located in the rear sections of the aircraft and experience different thermal conditions based on the flight profile of the aircraft.

During routine flight profiles, the ambient environment surrounding electronics assembly 150 (including any aircraft bulkhead to which it is mounted) is expected to remain at temperatures that allow the inertial measurement units to remain below their rated temperature specification. In operation during steady-state thermal conditions, thermal management assembly 110 allows electronics assembly 150 to dissipate heat to the external environment and provides sufficient insulation so that phase change material 210 does not begin to melt.

Certain non-routine flight profiles, however, will cause the ambient environment surrounding electronics assembly 150 to significantly increase in temperature such that, in the absence of the present invention, the inertial measurement units would exceed their rated temperature for a sufficient duration of time to cause their failure. In safety critical applications, such as where these inertial measurement units are central to flight control functions, for example, such failure can result in a catastrophic failure of the aircraft. During these high temperature transient thermal conditions, PCM component 140 acts as a thermal shield for electronics assembly 150 by absorbing heat. The phase change material 210 will undergo a phase transition from solid to liquid providing a constant temperature heat sink set to a pre-determined melting temperature, based on the material properties of phase change material 210, until phase change material 210 melts out. The target melting temperature for the phase change material 210, and the duration of the expected severe temperature excursion are thus both factors considered when designing PCM component 140, because they dictate the overall heat sinking capacity of PCM component 140.

The melting temperature of phase change material 210, and thus the sinking temperature provided by PCM component 140, is largely dictated by the selection of material used for fabricating phase change material 210. Techniques for determining and engineering the melting temperature and rate of phase change of a given phase change material are known to those of ordinary skill in the art. Thus, selections for fabricating phase change material 210 for thermal management assembly 110 are readily determined for a particular application by one of ordinary skill in the art upon reading this specification. In one embodiment, phase change material 210 comprises Acetamide. In other embodiments, the use of different phase change materials are contemplated.

In the embodiment described above, where thermal management assembly 110 supports and protects one or more inertial measurement units located in the rear sections of an aircraft, bulkhead and ambient temperatures of approximately 71 deg. C. would be typical during steady state thermal conditions. Industrial electronic devices such as inertial measurement units are often designed to operate in thermal conditions up to 95 deg. C. For such an application, Acetamide possesses the desirable characteristics of having a melting point of 81 deg. C., which is above expected temperatures during steady state thermal conditions, but below the thermal rating limitations of the inertial measurement units that comprise electronics assembly 150. For such an application, thermal testing performed by the applicants has shown that an Acetamide based PCM component 140 can maintain an interfacing surface between PCM component 140 and electronics assembly 150 at temperatures below 91 deg. C. under testing conditions approaching 110 deg. C., which approximates the temperatures expected during certain high temperature transient thermal conditions.

The duration of time that PCM component 140 can function as a heat shield, that is the time it takes for phase change material 210 to melt from a solid phase to a liquid phase, is largely dictated by the amount of phase change material 210 contained within PCM component 140. Accordingly, PCM component 140 should be designed with a sufficient amount of phase change material 210 so that it will not completely melt before the end of the high temperature transient thermal conditions it is designed to protect against. One of ordinary skill in the art upon reading this specification would also appreciate that the amount of phase change material 210 required can be reduced by selecting an insulating component 130 that reduces the boundary heat load imposed on phase change material 210. Conversely, the over-sizing the amount of phase change material 210 used to fabricate PCM component 140 can provide an additional margin of heat sinking capacity. The heat load normally dissipated by electronics assembly 150, the duration of time an expected high temperature transient thermal conditions will exist, and the maximum thermal conditions expected during an expected high temperature transient thermal event, are application specific considerations which one of ordinary skill in the art upon reading this specification can readily determine when selecting both the type and the amount of phase change material for designing PCM component 140.

Figure 3:
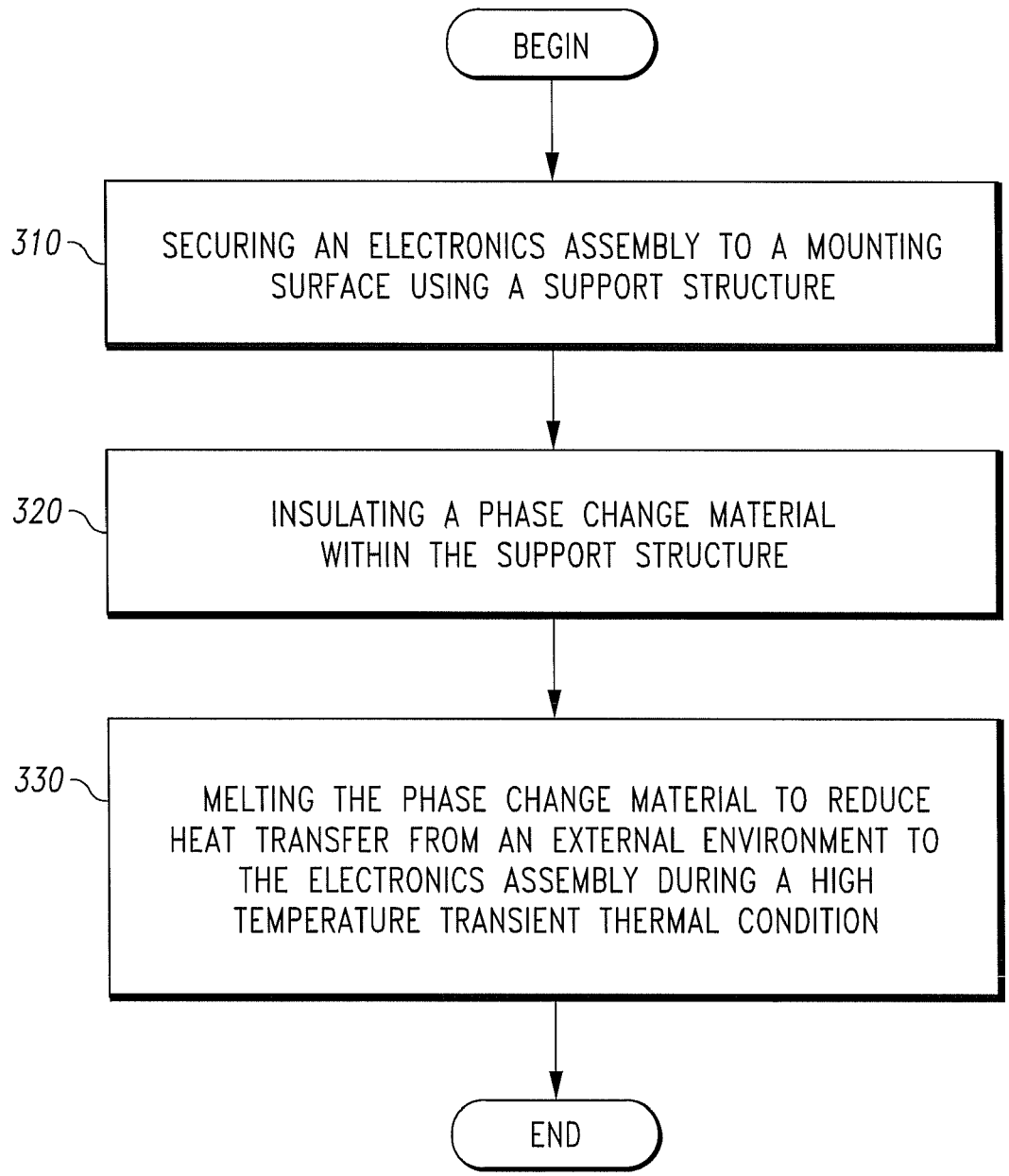
FIG. 3 is a flow chart of a method of one embodiment of the present invention.

FIG. 3 is a flow chart illustrating a thermal management method of one embodiment of the present invention. In one embodiment, the method is performed using a thermal management assembly such as the one described with respect to FIG. 1. The method begins at 310 with securing an electronics assembly to a mounting surface using a support structure. In one embodiment, the support structure is a structural component of a thermal management assembly such as that shown with respect to FIG. 1. The support structure provides a stable platform to support mounting the electronic assembly to a bulkhead or similar mounting surface. The support structure includes any functionality required for securing the thermal management assembly to the mounting surface, and thus supports mounting the electronic assembly to the surface. The support structure is also thermally insulative. In addition to providing physical support, the support structure serves to at least partially shield the electronic assembly from any surrounding heat loads by reducing conductive and convectional thermal transfer from the surrounding environment to the electronic assembly. The support structure also provides conductive and convective heat transfer paths that allow the electronic assembly to dissipate heat while maintaining temperatures within a rated operating range under steady state thermal conditions. In an alternate embodiment, the method includes sealing the electronic assembly within the support structure to protect it from potentially harmful corrosive environments or from direct fluid interactions.

The method proceeds at 320 insulating a phase change material within the support structure. In one embodiment, the phase change material is sealed within an enclosure with a carbon fiber core structure. In one embodiment, the carbon fiber core comprises a honeycomb type structure that supports the phase change material within enclosure. The carbon fiber core also provides heat paths for channeling heat absorbed by the enclosure from outside sources evenly through-out the entire volume of the phase change material. Evenly distributing heat ensures that melting of the phase change material occurs evenly. Insulating the phase change material reduces the transmission of heat the surrounding environment and from the mounting surface to the phase change material and thus extends the duration of time through which the phase change material can function as a thermally absorbent heat shield during a high-temperature thermal transient condition. In one embodiment, insulating a phase change material comprises locating an insulating material, such as but not limited to ROHACELL® foam, between the phase change material and the mounting surface. In one embodiment, an insulating material is sealed within the support structural to prevent the insulating material from being exposed to hazardous materials.

The phase change material provides a constant temperature base that thermally shields the electronic assembly during high temperature transient events by passively absorbing heat dissipated from the mounting surface and from the surrounding environment. A direct contact interface between at least one surface of the electronic assembly and the enclosure holding the phase change material provides an efficient heat transfer path to ensure that heat absorbed by the enclosure is transmitted to the phase change material. The phase change material relies on its latent heat of melting for thermal storage to maintain itself at its melt temperature until it has completely melted into liquid form. In other words, under high temperature thermal transient conditions, as the phase change material reaches the temperature at which it begins to changes phase from solid to liquid, it is able to absorb large amounts of heat without itself getting hotter until it completely melts.

Accordingly, the method proceeds to 330 with melting the phase change material to reduce heat transfer from an external environment to the electronics assembly during a high temperature transient thermal condition. For example, in one embodiment, an aircraft includes inertial measurement units secured to the rear section of the aircraft on an aircraft bulkhead. These inertial measurement units experience different thermal conditions depending on the flight profile of the aircraft. During routine flight profiles, the ambient environment surrounding the inertial measurement units is expected to remain at temperatures that allow the inertial measurement units to remain below their rated temperature specification. During such steady-state thermal conditions, the support structure of the thermal management assembly allows the inertial measurement units to dissipate heat to the external environment and provided sufficient insulation so that the phase change material does not begin to melt. During certain non-routine flight profiles, however, the ambient environment surrounding the inertial measurement units significantly increase in temperature such that, in the absence of the present invention, the inertial measurement units would exceed their rated temperature for a sufficient duration of time to cause their failure. During these high temperature transient thermal conditions, melting the phase change material to reduce heat transfer acts as a thermal shield for the inertial measurement units by absorbing heat. The melting phase change material provides a constant temperature heat sink set to a pre-determined melting temperature, based on the material properties of the phase change material, until the phase change material completely melts. In one embodiment, the phase change material is Acetamide. Acetamide possesses the desirable characteristics of having a melting point of 81 deg. C., which is above the approximately 71 deg. C. expected steady state thermal conditions experienced in the above described aircraft embodiment, but below the 95 deg. C. thermal limitations of the particular inertial measurement units.

One of ordinary skill in the art upon reading this specification would appreciate that the temperatures, phase change materials, insulating materials and structural materials discussed in this specification are provided as examples only. Other embodiments utilize other phase change materials having other melting points and phase change rates, as well as other insulating materials and structural materials, are contemplated as embodiments within the scope of the claims. One of ordinary skill in the art upon reading this specification is readily able to select phase change materials, insulating materials, and structural materials for their particular application using the guidance provided by this specification.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A thermal management assembly apparatus, the apparatus comprising:
   a structural component coupled to an electronics assembly housing an inertial measurement unit, wherein the structural component is configured to support mounting the electronics assembly to a surface such that the electronics assembly remains at least partially exposed when coupled to the structural component;
   a phase change material component comprising a phase change material that remains sealed within an enclosure, the enclosure housed within the structural component such that a first external side of the enclosure is interfacing with at least one surface of the electronics assembly; and
   an insulating component housed within the structural component between a second external side of the enclosure and the surface;
   wherein the insulating component is configured to reduce heat transmission to the phase change material component from the surface.

2. The apparatus of claim 1, wherein the structural component shields the phase change component from surrounding heat loads by reducing conductive and convectional thermal transfer of heat from the surrounding environment.

3. The apparatus of claim 1, wherein the structural component provides one or more heat transfer paths that allow the inertial measurement unit to dissipate heat under steady state thermal conditions.

4. The apparatus of claim 1, wherein the electronics assembly is ventilated by one or more vents within the structural component.

5. The apparatus of claim 1, wherein the phase change material component comprises a phase change material that melts during a high temperature transient thermal condition to shield the electronics assembly from heat dissipated by one or both of the supporting surface, and a surrounding environment.

6. The apparatus of claim 5, wherein the phase change material has a melting point based on heat dissipated by the electronics assembly during a steady state thermal condition and based on a heat dissipated by the surrounding environment during the high temperature transient thermal condition.

7. The apparatus of claim 1, wherein the phase change material component includes a quantity of the phase change material such that the phase change material will not completely melt during a pre-determined expected duration of the high temperature transient thermal condition.

8. The apparatus of claim 1, wherein the phase change material component comprises Acetamide.

9. The apparatus of claim 1, wherein the insulating component is sealed within the structural component.

10. The apparatus of claim 1, wherein the insulating component shields the phase change material component from heat dissipated by a supporting surface during a high temperature transient thermal condition.

11. A thermal management method, the method comprising:
    securing an electronics assembly housing an inertial measurement unit to a mounting surface using a thermally insulative support structure such that the electronics assembly remains at least partially exposed when coupled to the thermally insulative support structure;
    insulating a phase change material within the support structure, wherein the phase change material is sealed within an enclosure; and
    melting the phase change material to reduce heat transfer from an external environment to the inertial measurement unit during a high temperature transient thermal condition, wherein the phase change material remains sealed within the enclosure during the melting.

12. The method of claim 11, further comprising:
    coupling the electronics assembly to the thermally insulative support structure; and
    securing the thermally insulative support structure to the mounting surface.

13. The method of claim 11, wherein melting the phase change material further comprises:
    melting the phase change material at a temperature lower than a pre-determined thermal limit of the inertial measurement unit.

14. The method of claim 11, wherein melting the phase change material further comprises:
    melting a quantity of the phase change material such that the phase change material will not completely melt during a pre-determined expected duration of the high temperature transient thermal condition.

15. The method of claim 11, wherein melting the phase change material further comprises:
    maintaining the phase change material in an un-melted phase during a steady state thermal condition.

16. The method of claim 11, wherein securing an electronics assembly to a mounting surface using a thermally insulative support structure further comprises:
    providing a direct interfacing heat transfer path from at least one surface of the electronics assembly to the phase change material.

17. A thermal management assembly, the assembly comprising:
    means for securing an electronics assembly housing an inertial measurement unit to a mounting surface using a support structure such that the electronics assembly remains at least partially exposed when coupled to the means for securing;
    means for thermally shielding the electronic assembly by providing a constant temperature base using a phase change material that remains sealed within an enclosure, the means for thermally shielding housed within the support structure such that a first external side of the means for thermally shielding is interfacing with at least one surface of the electronics assembly; and means for reducing heat transmission between the phase change material and an external environment.

18. The assembly of claim 17, wherein the external environment includes the mounting surface.

19. The assembly of claim 17, wherein melting the phase change material has a melting point temperature that is lower than a pre-determined thermal limit for the inertial measurement unit; and wherein the phase change material has a melting point temperature greater than a predetermined melting temperature, the predetermined melting temperature based on a steady state thermal condition.

20. The assembly of claim 17, wherein the support structure includes at least a quantity of the phase change material such that the phase change material will not completely melt during a pre-determined high temperature transient thermal event.

* * * * *